Patented Oct. 10, 1944

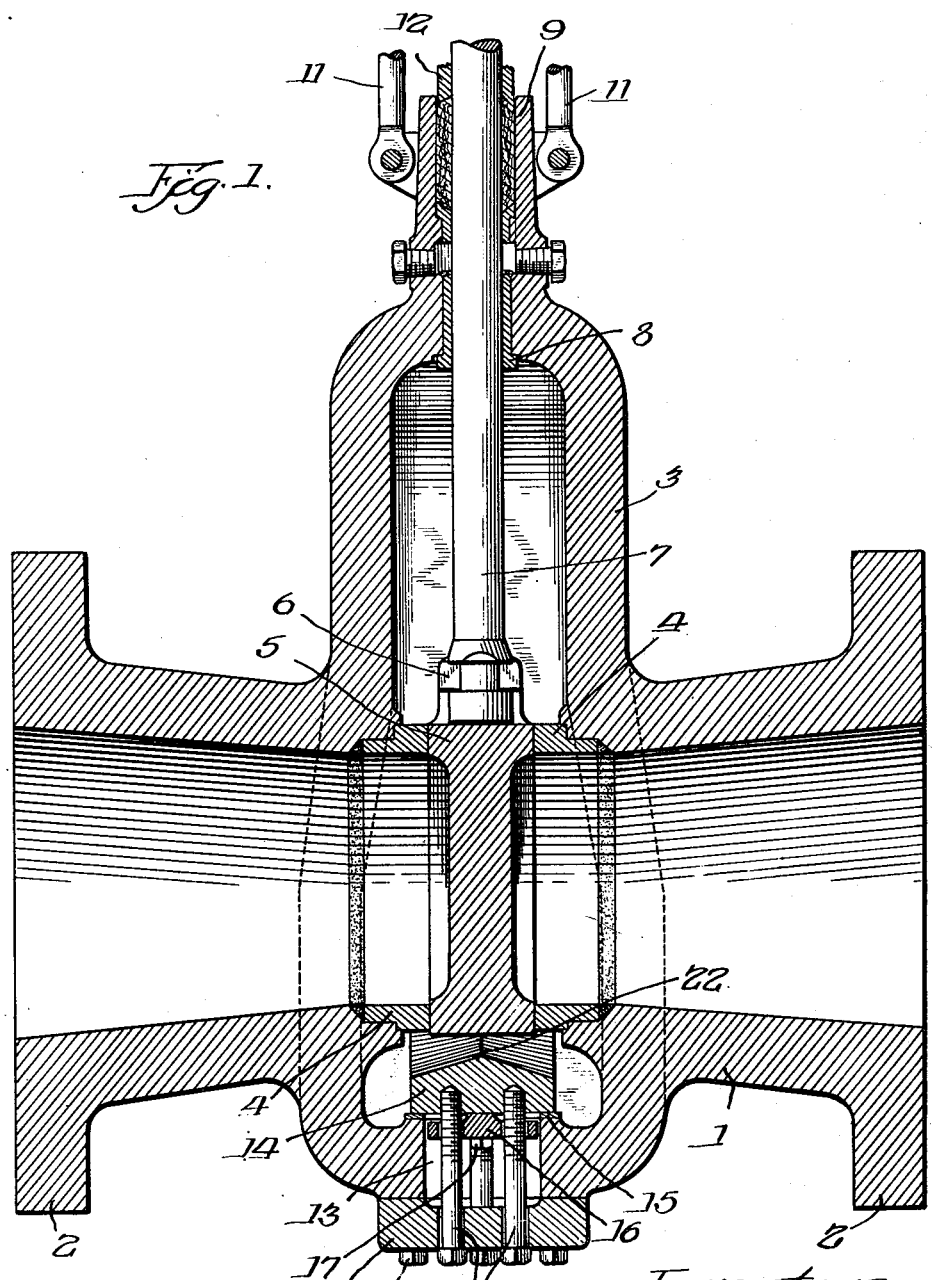

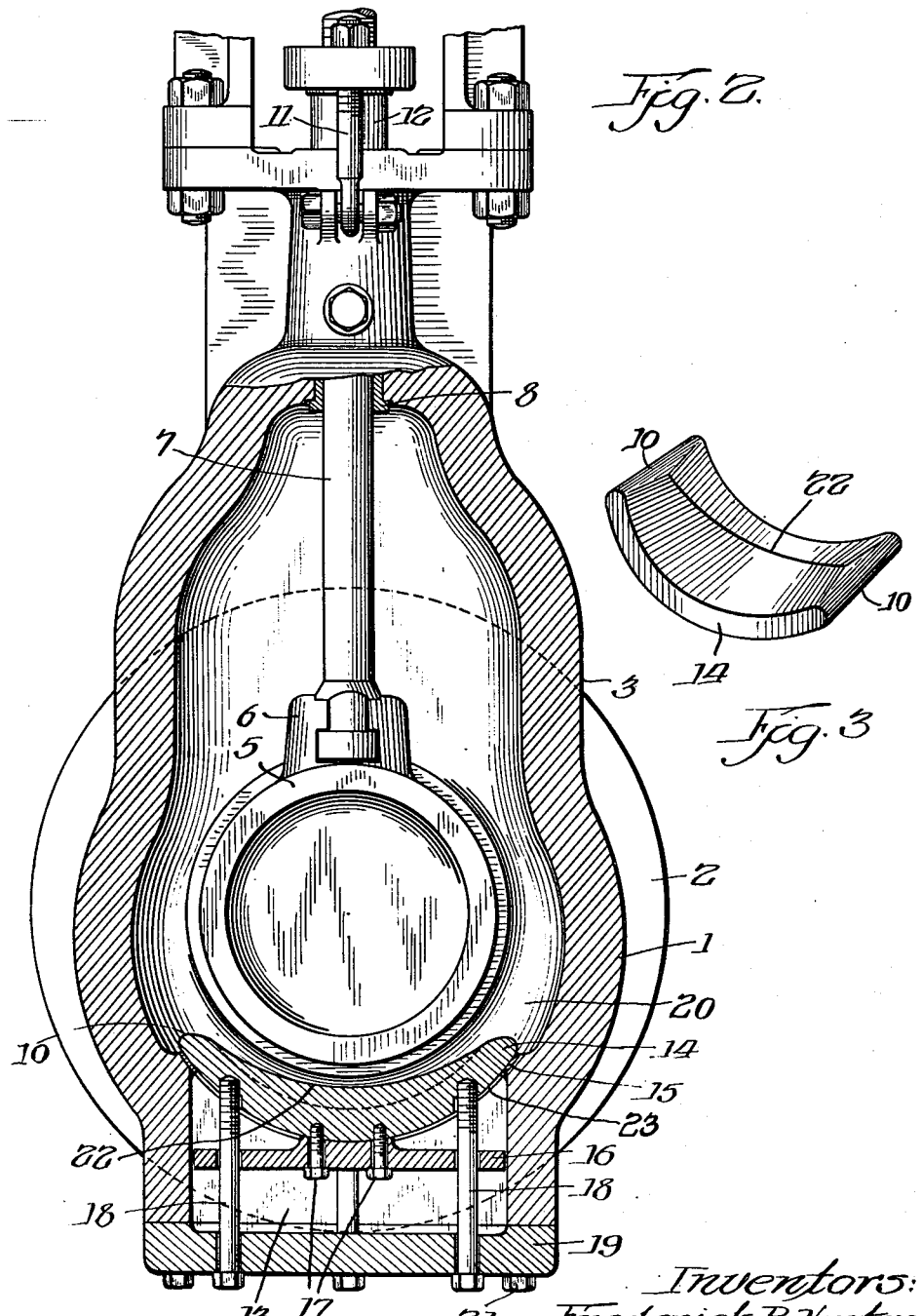

2,359,741

UNITED STATES PATENT OFFICE 2,359,741

VALVE

Frederick R. Venton, Elmhurst, and Murray A. Gleeson, Chicago, Ill., assignors to Crane Co., Chicago, Ill., a corporation of Illinois Application March 20, 1943, Serial No. 479,950

3 Claims. (Cl. 251—156)

This invention relates to a new and improved handhole cover for valves and similar types of pressure retaining vessels. More especially, it has for one of its principal objects the provision of a novel form of handhole cover preferably arcuately shaped so as to conform to the substantially circular shape of the valve body or other rounded casings to which it is applicable, and in addition possessing the advantages of being easily and conveniently conformable to such valve shape or the like by employing relatively cheap, simple and accurate machining, as for example, in a lathe.

Another important object of this invention is to provide a handhole cover for valve bodies or similar pressure vessels in which the contact surface of such novel cover is curved preferably in the form of a circular segment or arc and provides by reason of such latter configuration the advantage of requiring only a relatively small amount of space for its easy and ready insertion into pressure sealing position within the valve body or casing.

A further important object of this invention lies in the provision of an arcuately shaped handhole cover adapted to be inserted through a relatively small aperture wherein its novel shape permits its passage therewithin and adjacent to the usual internal valve trimming preliminarily, finally permitting it to assume a position within the aperture closed by the cover so that the internal fluid pressure within the vessel aids in providing a fluid tight contact with the casing.

A further important object of this invention is to provide a novel type of bonnetless valve in which such trimmings as the valve stem, the valve closure member, the seat ring, the stemhole bushing and the like are readily insertable through the handhole cover preferably located in the body or casing portion of the valve and are pressure sealed therewithin by means of an arcuately shaped pressure sealing cover likewise insertable through the handhole subsequent to the positioning of the above mentioned valve trimmings within the casing.

Another object is to provide an arcuately shaped handhole cover permitting easy insertion within a valve casing or the like in which such novel cover conforms substantially to certain prescribed circumferential limits afforded by the valve body or casing.

Heretofore, to our knowledge, handhole covers for this general purpose have been provided with substantially flat or plane surfaces in their usual configuration and it has therefore been necessary in such cases to provide a correspondingly flat type of bearing surface in the valve body or other pressure vessel to which the cover was to be applied. The usual contour of such valve body or pressure vessel was ordinarily describable as being generally circular in a transverse section and therefore upon applying a handhole cover therewithin it was necessary to arrange for a flat contact surface. This was only accomplished generally by resorting to expensive machining in order that the cover plate with the plane surfaces could be used to form the desired pressure tight seal with the casing. Also, in order to obtain the usual flat seating surface within the body which preferably extends around the inner portion of the aperture forming the handhole or opening, it was necessary to either thicken the adjoining section of the valve body before machining or otherwise enlarge the body with a heavy section adjacent such opening. Further it was found that in employing the conventional handhole cover of the prior plane surface type, as distinguished from the applicants' novel form as hereinafter described, it was necessary to provide a chamber of unduly large and heavy proportions in the lower portion of the valve casing in order to accommodate the handhole cover. The latter arrangement was necessary primarily because of the need for having considerable space to manipulate the handhole cover into its final position within the lower portion of the valve chamber. More specifically, the prior handhole constructions of this general character have lacked the significant advantages of the instant invention in which a minimum amount of space for the lower valve chamber is combined with a novel shape of handhole cover to require only a fractional portion of the space heretofore deemed to be necessary, the cover by reason of its novel form allowing for its simple manipulation to the final positioning in the valve chamber in a manner impossible of execution when employing the prior forms of covers.

Thus these prior shortcomings have been substantially overcome by the novel design embodied in this invention and other advantages thereof will become apparent upon referring to the accompanying drawings, in which Fig. 1 is a fragmentary sectional assembly view of a valve embodying our invention.

Fig. 2 is a similar view taken substantially at right angles to the assembly described in connection with Fig. 1.

Fig. 3 is a perspective view of one form of the novel handhole cover incorporating the principles of our invention.

Similar reference characters refer to similar parts throughout the various views.

Referring now to Fig. 1, the valve body or casing generally designated 1 is provided with the usual end connections or flanges 2 for assembly with a pipeline, and as a background emphasizing the need for employing a handhole cover arrangement the valve casing is preferably made without providing the bonnet as a separate part. Preferably, the bonnet portion is thus made integral with the valve casing as indicated at 3, accordingly being distinguished from the usual valve bonnet construction as shown, for example, on page 298 of the No. 41 Catalogue published by Crane Co. Of course, the valve need not necessarily be of the integral bonnet type, since a conventional valve may employ the handhole for cleanout, drain purposes or the like.

Internally, the valve casing is provided with the usual valve trimmings such as the seats 4 which may be either threaded, welded, brazed or otherwise attached to the valve casing and while a parallel seat type of construction is shown, it is obvious that insofar as the contact surface of the seat rings is concerned, numerous forms of valve seats may be used without departing from the possible application of our inveniton as hereinafter described.

A conventional valve closure member 5 is provided and is shown attached to the valve stem 7 by means of the usual T head connection 6, the valve stem being reciprocably movable to accomplish the opening and closing movement of the valve by means of stem threads or other means of actuation not shown. In the upper end portion of the integral valve bonnet 3, the usual stemhole bushing 8 is provided, having the stuffing box 9 and with the usual gland bolts 11 for compressing the packing therein by means of the gland 12 partly shown.

The valve trimmings hereinabove described such as the valve stem 7, the valve seat rings 4, the valve closure member 5 and the stemhole bushing 8 are readily insertable within the valve casing 1 by movement through the lower chamber portion of the valve casing, after being initially passed through the substantially oblong formed aperture or handhole 13. The latter aperture is closed by means of the novel cover 14 which, in combination with the unusual arcuately extending inner surface arrangement employed adjoining the perimetral limits of the aperture, constitutes the essence of our invention. Hence the inner raised contact surface portion of the casing, as shown more clearly at 15 in Fig. 2, is preferably formed by means of machining such raised surface as an arcuate portion or radius of a circle, and this is likewise true in machine finishing the contact surface 23 of the cover 14. This method of machining serves two important functions: first, enabling the machined surface around the generally rectangularly shaped aperture 13 for contact with the complementary surface portion of the cover 14 to be easily and accurately formed, as by turning in a lathe; and second, employing an arcuate segment for the transverse section of the cover 14 thereby permitting the latter member to be easily insertable through the aperture 13 into the annular valve chamber 20. In the latter connection it has been found that by holding the cover 14 angularly from the vertical, and sideways or transversely to the line of flow therethrough and thrusting the same inwardly so that its upper forward end 10 projects substantially into the valve chamber 20, the cover can easily be placed in the ultimate seating position illustrated. As it is moved inwardly and upwardly into the valve chamber, the cover 14 is simultaneously rotated slightly so that its contact surface 23 is now turned face downward so as to ultimately contact the preferred hardened sealing surface 15 of the casing. The cover is then ready for its final positioning within the casing as hereinafter described. The operation may be reversed in removing the cover from the casing.

However, it should be noted that if it is not convenient to remove the cover 14 bodily from the casing, it may be slidably moved arcuately to either side of the casing aperture and thus clear the way through the aperture 13 to remove the valve trimmings or to make such interior inspection as may be desirable without removing the cover from the chamber 20. To our knowledge no one heretofore has provided a pressure sealing handhole cover capable of being so easily and conveniently removed or displaced from or within a casing respectively.

It has been found desirable, although not necessary, to provide a positioning member 16 which fits relatively snugly within the aperture 13 and thus serves to locate the ultimate positioning ol the cover 14 relative to the seat 15 more accurately. The positioning member 16 may be suitably attached to the cover 14 by means of the bolts 17. In order to maintain the cover 14 in initial abutting relation against the seat 15 of the casing 1, the bolts 18 provide for the desired alignment and seating relationship between the cover and casing, line pressure within the casing actually effecting pressure tightness therebetween. Thus the outer cap 19 serves primarily as a means for positioning the bolts 18 and thereby holding the cover 14 in position prior to pressure within the casing maintaining the latter member tightly against its seat. The bolts 21 hold the cap 19 in place upon the casing 1.

The handhole cover 14 may be suitably strengthened when desired by thickening the central portion as indicated at 22, preferably tapering on either side of the central portion which also permits of the desired clearances when positioning the cover within the casing as above described.

It is apparent that the cover 14 and its positioning arrangement may assume a variety of different forms and therefore the scope of our invention should be interpreted only in light of the appended claims.

We claim:

1. In a valve, a valve casing, the said casing having an aperture to permit the insertion of internal parts therewithin, a removable cover fitted within said casing aperture in sealed relation upon inner perimetral limits of the aperture, a portion of the perimetral limits of the said aperture being defined as an arcuate portion having a radius of curvature extending transversely to the longitudinal axis of the said casing and uninterrupted by the inner wall of the casing throughout a circle defined by said radius.

2. In a valve, a valve casing, the said casing having an aperture to permit the insertion of inner valve trimmings, a removable cover fitted within said casing in seated relation upon the inner perimetral limits of the aperture, the perimetral limits of the valve casing aperture upon which the cover is seated in one direction describing an arc having a radius of curvature contained within the casing and uninterrupted thereby throughout a circle defined by said radius of curvature.

3. In a valve, a valve casing having a partially cylindrical portion and an aperture, the inner face of the aperture formed to substantially follow a portion of the radius of curvature of the said cylindrical portion of the casing and uninterrupted by the inner wall of the casing throughout a circle defined by said radius of curvature, the radius of curvature which defines the aperture limits in one direction being substantially equal to the distance between the horizontal centerline and the internal lower portion of the said casing, a removable handhole cover therefor seated within the casing and adapted to pass within the perimetral limits of the casing aperture and having a seating surface with a radius of curvature substantially equal to that of the casing aperture in one direction.

FREDERICK R. VENTON.
MURRAY A. GLEESON.